United States Patent [19]

Craig

[11] 4,139,067
[45] Feb. 13, 1979

[54] POST DRIVING ATTACHMENT FOR TRACTOR

[76] Inventor: Frederick W. Craig, 7460-148th St., Surrey, British Columbia, Canada, V3S 3E7

[21] Appl. No.: 839,236

[22] Filed: Oct. 4, 1977

[51] Int. Cl.² ............................................. B25D 9/00
[52] U.S. Cl. .................................... 173/100; 173/27; 74/104
[58] Field of Search ................. 74/96, 99 R, 101, 104, 74/105; 173/22, 27, 38, 90, 100, 128, 129, 130, 43, 44

[56] References Cited

U.S. PATENT DOCUMENTS

| 267,605 | 11/1882 | Sherman | 173/132 X |
| 1,986,296 | 1/1935 | Smith | 173/130 |
| 2,568,540 | 9/1951 | Chambers | 173/100 |
| 3,117,635 | 1/1964 | Deerkoski | 173/27 X |
| 3,205,952 | 9/1965 | Sicotte | 173/132 X |
| 3,302,731 | 2/1967 | Perry | 173/112 |
| 3,759,110 | 9/1973 | Davis | 74/99 R |

FOREIGN PATENT DOCUMENTS

| 405612 | 10/1970 | Australia | 173/100 |
| 1267176 | 4/1968 | Fed. Rep. of Germany | 173/90 |
| 1213 of | 1906 | United Kingdom | 173/130 |
| 1273973 | 5/1972 | United Kingdom | 173/100 |

*Primary Examiner*—Lawrence J. Staab

[57] ABSTRACT

An apparatus for driving posts into the ground, comprises a hammer for striking the top of the post to be driven, an articulated arm for connecting the hammer to a mobile power unit; and means for raising the articulated arm so that the hammer is above the post. The hammer is pivotally connected to the arm so that the hammer will strike the top of the post generally squarely when the power unit is level and when the power unit is not level.

5 Claims, 3 Drawing Figures

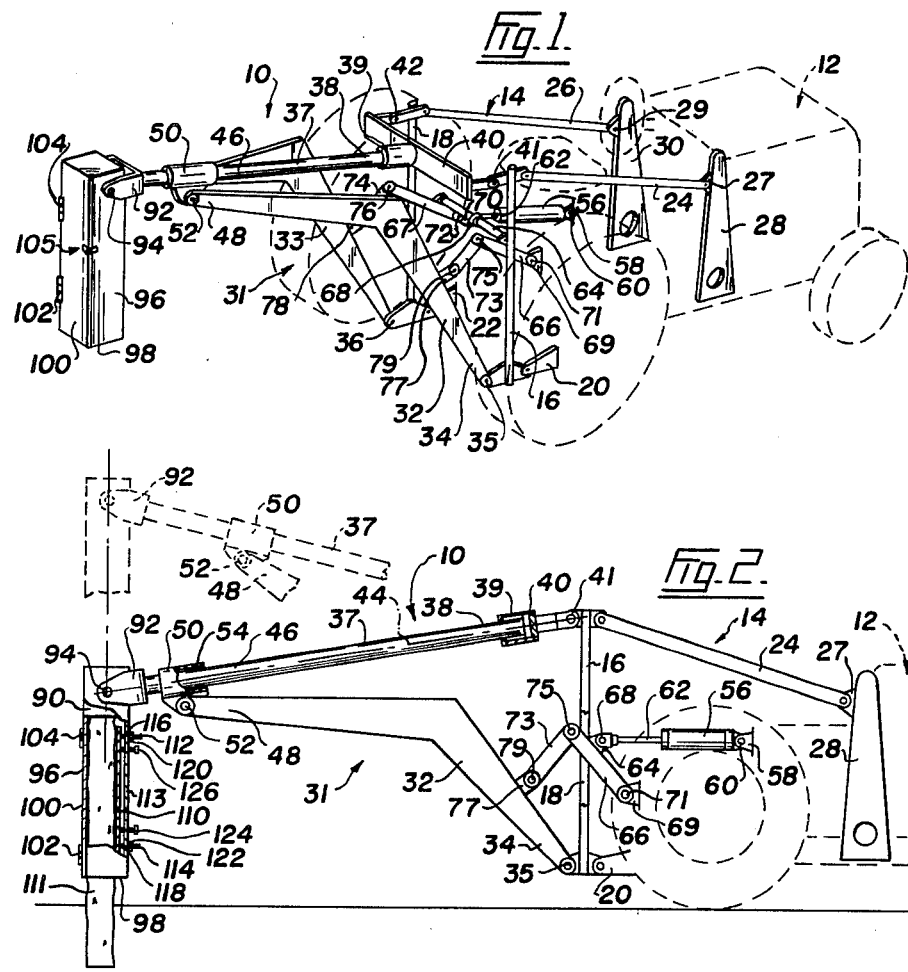
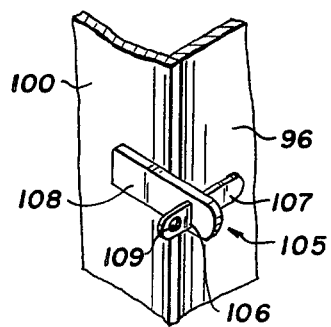

POST DRIVING ATTACHMENT FOR TRACTOR

BACKGROUND OF THE INVENTION

This invention relates to an apparatus for driving posts into the ground.

Post drivers commonly include a heavy hammer which is raised above the post to be driven and the inertia gained by the heavy hammer falling towards the post causes the post to be driven into the ground as the hammer strikes the post. Post drivers preferably include a guide for holding the post in position until it is driven into the ground. Some post drivers, for example as disclosed in U.S. Pat. No. 3,302,731 to Perry, employ a guide frame with a hammer slidable on the frame to a position above the top of the post.

Some prior art post drivers have been, however, relatively complicated and heavy. Not only does their heavy weight increase shipping costs of the equipment, but makes their use difficult on soft ground when attached to mobile equipment. When post drivers are provided as attachments, for example on tractors, a second man may be required for operation of the post driver besides the tractor operator.

SUMMARY OF THE INVENTION

According to this invention, there is provided an apparatus for driving posts into the ground. The apparatus comprises a hammer for striking the top of a post to be driven, an articulated arm for connecting the hammer to a mobile power unit, the hammer being pivotally connected to the arm so that the hammer will strike the top of the post generally squarely when the power unit is level and when the power unit is not level, and means for raising the articulated arm so that the hammer is above the post.

The invention provides an apparatus for driving posts which is simple and economical to produce and is also relatively light weight. The reduction in weight over some prior art post drivers reduces shipping costs and allows tractors to move more easily over soft ground when such an apparatus for driving posts is provided as an attachment. The present apparatus is considerably easier to set up at the site where a post is to be driven and is more easily moved from site to site, since there is no ground supported frame, and the proper orientation of the hammer is assured regardless of whether or not the tractor is level. It is quite feasible for one man to operate the tractor and the apparatus for driving posts according to the invention. The configuration of the present invention allows its operation over obstructions, such as rock piles, which may be positioned between the tractor and the site where the post is to be driven.

In drawings which illustrate embodiments of the invention:

FIG. 1 is a perspective view of an apparatus for driving posts into the ground according to an embodiment of the invention;

FIG. 2 is a side elevational view of the embodiment shown in FIG. 1;

FIG. 3 shows the latch of a depending guide for the embodiment shown in FIG. 1.

DESCRIPTION OF THE PREFERRED EMBODIMENT

FIGS. 1 and 2 show an apparatus 10 for driving posts into the ground. The apparatus 10 is mounted on a tractor 12 and includes a frame 14. Frame 14 has a pair of upright members 16 and 18 attached to lugs 20 and 22 at the rear of the tractor near the ground. The top of the uprights 16 and 18 are attached at their upper ends to braces 24 and 26 respectively. Braces 24 and 26 are attached to lugs 27 and 29 of uprights 28 and 30 which are welded to the frame of the tractor 12.

The apparatus 10 has an articulated arm 31 comprising adjacent parts 32 and 33 and having a proximal end 34 pivotally attached to the frame 14 adjacent lugs 20 and 22 of the tractor 12 by link pins 35 and 36. The apparatus 10 also has a connecting link 37 having a proximal end 38 pivotally connected for vertical movement to frame 14 near the tops of upright members 16 and 18 by means of connecting link swivel 39, cross bar 40, and link pins 41 and 42. Connecting link swivel 39 permits rotation of connecting link 37 about an axis 44 passing through the proximal end 38 and the distal end 46 of connecting link 36. Articulated arm 31 has a distal end 48 pivotally connected to connecting link 37 by means of bearing block 50 and link pin 52. Bearing block 50 has a bearing 54 permitting rotation of connecting link 36 about axis 44 and permitting movement of bearing block 50, and distal end 48 of articulated arm 31, along connecting link 37 parallel to axis 44.

The apparatus 10 also includes a hydraulic cylinder 56 pivotally connected to lug 58 of tractor 12 by link pin 60. Rod 62 of cylinder 56 is pivotally connected by link pin 68 to crossbar 64 connected between links 66 and 67. Links 66 and 67 are pivotally connected to lugs 69 and 70 of tractor 12 near by link pins 71 and 72. Links 66 and 67 are pivotally connected to links 73 and 74 respectively by means of link pins 75 and 76. Link 73 and 74 are pivotally connected to lugs 77 and 78 of articulated arm 31 by link pins 79 and 80 (not shown).

The apparatus 10 is also provided with a hammer 90 pivotally connected to distal end 46 of connecting link 37 by means of fork 92 and link pin 94. Hammer 90 has a box-shaped depending guide 96 having an open end 98 on the bottom thereof. Guide 96 has an access door 100 having hinges 102 and 104, for permitting post 111 to be placed within guide 96, and latch 105. Latch 105 comprises bar 107 welded to guide 96 and passable through elongated aperture 106 in bar 108 welded to door 100. A peg (not shown) is placed in aperture 109 of bar 107 to keep the door 100 shut. Adjusting plate 110 permits adjustment of guide 96 for posts 111 of different sizes. Threaded studs 112 and 114 have one end attached to plate 110 and pass through apertures 116 and 118 respectively in side 113 of guide 96. Nuts 120 and 122 on studs 112 and 114, respectively, permit adjustment of plate 110 towards side 113. Bolts 124 and 126 are threaded through side 113 to permit adjustment of plate 110 away from side 113.

In operation, articulated arm 31 is first raised by means of cylinder 56 acting through links 66, 67, 73 and 74. As arm 31 moves upwards, bearing 54 permits bearing block 50 to slide along connecting link 37 towards connecting link swivel 39 and lifts distal end 46 of connecting link 37 away from the ground. When hammer 90 and depending guide 96 have been raised sufficiently high just before open end 98 clears the top of the post to be driven, as shown in dotted lines, access door 100 may be opened on hinges 102 and 104 and a post 111 placed within depending guide 96. It is important to note that the centre of gravity of hammer 90 and and depending guide 96 is located below link pin 94 connecting hammer 90 to fork 92 and connecting link 37 and below axis 44. Consequently, gravitational forces align the depending guide 96 to hold a post 111 generally vertical, regardless of the position of arm 31, connecting link 37, or whether or not the tractor 12 is level, by rotating hammer 90 and depending guide 96 about link pin 94 and axis 44. This is a particularly desirable feature where the tractor 12 and apparatus 10 must be operated on rough or uneven surfaces. There is no need to align the anvil 90 and guide 96 in any manner, since the guide 96 will align itself properly in a pendulum-like manner, and hammer 90 will strike the post 111 squarely, even if the tractor 12 should not be level. The post 111 is driven into the ground by allowing hydraulic fluid to freely escape from cylinder 56, whereby articulated arm 31 and connecting link 37 swing towards the ground and hammer 90 strikes post 111. Besides hammer 90, the momentum gained by articulated arm 31 and connecting link 37, in their downwardly swing, act upon post 111 as hammer 90 strikes post 111, thus increasing the driving force. The automatic alignment feature of the hammer 90 and depending guide 96 of the present invention makes quite feasible the operation of the tractor 12 and the apparatus 10 by one man. It should also be noted that the configuration of the apparatus 10 readily allows posts to be driven beyond obstructions between the tractor 12 and the position where the post is to be driven. As best seen in FIG. 2, the deviation of hammer 90 and guide 96 from vertical alignment with post 111 is slight as the hammer 90 and guide 96 move in the arcuate path between the raised and lowered positions. This is important for the proper operation of such an apparatus.

What I claim is:

1. A post driver adapted for attachment to a tractor, comprising:

a frame with a top end and a bottom end and attachable to the tractor;

a connecting link with a proximal end pivotally connected to the frame generally near the top of the frame for upward and downward movement, the link extending away from the frame to a distal end of the link, the link having a longitudinal axis passing through the distal end and the proximal end of the link;

a hammer having an open ended depending guide extending therefrom adapted freely to embrace and slide up and down a post to be driven, the hammer being pivotally connected to the link near the distal end of the link for pivoting towards and away from the frame, the hammer, the connecting link and the frame being connected for pivoting of the hammer about the longitudinal axis of the link and the hammer and guide having a center of gravity below the distal end of the link so that gravitational forces align the hammer and guide, the hammer can strike the top of the post squarely and the guide can hold the post vertically; and, an articulated arm pivotally connected to the frame generally near the bottom of the frame for upward and downward movement, the arm extending away from the frame to a distal end of the arm, the arm and the frame being connected by at least one fluid cylinder for moving the arm upwardly and downwardly, the distal end of the arm being slidably connected to the link for movement generally along the longitudinal axis of the link, permitting the hammer and the guide to move outwardly from the distal end of the arm when the arm moves upwardly and towards the distal end of the arm when the arm moves downwardly, so that the hammer and the guide remain generally in vertical alignment with the post to be driven during the upward and downward movement of the arm.

2. A post driver as claimed in claim 1, including first bearing means, near the proximal end of the connecting link, pivotally connectable to the tractor and second bearing means near the distal end of the connecting link pivotally connected to the articulated arm, the connecting link being rotatable in the bearing means.

3. A post driver as claimed in claim 2, wherein the depending guide has an access door for placing the post to be driven within the depending guide.

4. A post driver as claimed in claim 3, the depending guide being generally box-shaped and having an open end which faces the ground when the post driver is in position for use, the access door being on one side of the guide, and the guide including an internal adjustment means permitting the guide to be adjusted for post of different sizes.

5. A post driver as claimed in claim 4, the internal adjustment means comprising a plate located within the depending guide opposite the access door and adjustable to move towards or away from the door.

* * * * *